DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 6

T941,007

PREPARATION OF FLOWABLE, TABLETABLE ANTIOXIDANT MIXTURE CONTAINING SILICONES

Emma Jean Freeman, 1849 Fairoaks Road 37664, and Richard R. Crawford, 512 Brandonwood Road 37660, both of Kingsport, Tenn.

Continuation of abandoned application Ser. No. 270,425, July 10, 1972. This application June 15, 1973, Ser. No. 370,492

Int. Cl. A23l *3/34;* B01j *1/16*

U.S. Cl. 252—400 R

No Drawing. 11 Pages Specification

A flowable, tabletable mixture containing a silicone, an antioxidant, and an organic acid is prepared by forming a blend of the materials in a molten state, allowing the blend to cool and recrystallize while it is being vigorously stirred resulting in a crystalline particulate material which can be formed into tablets. These antioxidant tablets are available for addition to cooking oils and the like and especially oil utilized in deep-fat frying to inhibit the development of rancidity.